United States Patent Office 3,629,286
Patented Dec. 21, 1971

3,629,286
BIS-PHTHALIMIDINES
Jiro Tsuji and Tsunesuke Kajimoto, Kamakura, Kanagawa, Japan, assignors to Toray Industries, Inc., Tokyo, Japan
No Drawing. Filed Oct. 7, 1968, Ser. No. 765,684
Claims priority, application Japan, Oct. 13, 1967, 42/65,612
Int. Cl. C07d 27/50
U.S. Cl. 260—325          2 Claims

ABSTRACT OF THE DISCLOSURE

New phthalimidine compounds are described which are produced by reacting a Schiff base with carbon monoxide at 150° C.–300° C. in the presence of a catalytic amount of cobalt carbonyl in accordance with equation:

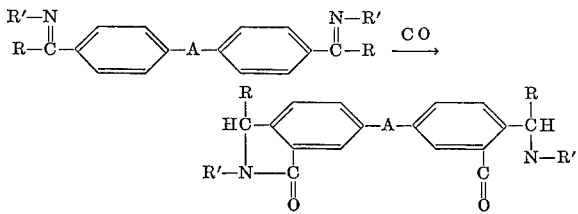

These new compounds provide a more economic route in the production of aromatic tetracarboxylic acids.

BACKGROUND OF THE INVENTION

(1) Field of the invention

The present invention relates to novel phthalimidine compounds and the process for producing the same. More particularly, the present invention relates to novel phthalimidine compounds which can readily be converted into aromatic tetracarboxylic acids having utility as polymeric materials, and the process for producing the same.

(2) Description of the prior art

It is known that aromatic tetracarboxylic acids having at least two linked benzene rings are important as starting materials for the production of polyimides and similar like polymeric materials. However, no satisfactory process has ever been established to our knowledge for the production of such aromatic tetracarboxylic acids on an industrial scale. Only one prior process hitherto proposed involves the linking of two benzene derivatives having attached alkyl groups and the like by means of a suitable, conventional method, followed by oxidation to obtain corresponding tetracarboxylic acids. This conventional process, however, often suffers from the simultaneous formation of isomers based on position isomerism, and is therefore less valuable as a process for the production of pure tetracarboxylic acids.

SUMMARY OF THE INVENTION

As a result of elaborate investigation to establish a new route for the production of tetracarboxylic acids with less isomer formation and with reduced formation of by-products, the products and process of this invention have been discovered. The products of this invention are phthalimidine compounds represented by the following general formula:

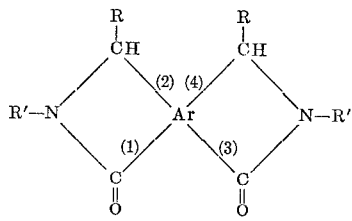

wherein Ar is a tetra-valent radical having at least two benzene rings, the linkages (1) and (2) are directly attached to adjacent carbon atoms of one of the benzene rings, and the linkages (3) and (4) are directly attached to adjacent carbon atoms of another benzene ring; R is a radical selected from the group consisting of —H, alkyl and aryl, and R' is a radical selected from the group consisting of alkyl and aryl.

The preferred compounds are those represented by the following general formula:

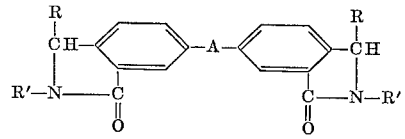

wherein A is either nil, or a divalent radical selected from the group consisting of alkylene radical having 1–3 carbon atoms, —O—, —S—, —$SO_2$—, —NH— and —CONH—; R is a radical selected from the group consisting of —H, alkyl having 1–4 carbon atoms and phenyl; R' is a radical selected from the group consisting of alkyl having 1–4 carbon atoms and phenyl.

This preferred compound is prepared by reacting a Schiff base represented by the formula:

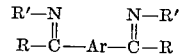

with carbon monoxide at a temperature in the range of from about 150° C. to about 300° C. in the presence of a catalytic amount of cobalt carbonyl. This reaction is illustrated by the following equation:

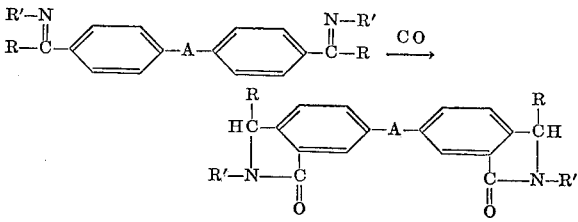

The Schiff base to be used in the process of this invention is readily obtained by reaction of an aldehyde or ketone with a primary amine. This reaction is illustrated by the following reaction equation:

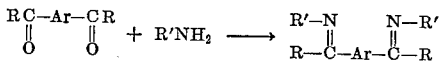

wherein R is a radical selected from the group consisting of —H, alkyl or aryl; R' is a radical selected from the group consisting of alkyl and aryl.

The aromatic aldehydes or ketones to be used for the preparation of Schiff base include, for example, 4,4'-diformylbiphenyl, 4,4'-diacetylbiphenyl, 4,4'-dipropionyl-biphenyl, 4,4'-diformyldiphenyl ether, 4,4'-diacetyldiphenyl ether, 4,4'-dipropionyldiphenyl ether, 4,4'-diformyldiphenyl sulfide, 4,4'-diacetyldiphenyl sulfide, 4,4'-diformyldiphenyl methane, 4,4'-diacetyldiphenyl methane, 4,4'-dipropionyldiphenyl methane etc. Other equivalent compounds may likewise be used to prepare this starting material.

The reaction is carried out only by contacting these aromatic aldehydes or ketones with the primary amine in the amount of about two to five moles based on the aldehydes or ketones, in organic solvents such as benzene, xylene, toluene, methanol, ethanol and ether at a temperature near room temperature, and removing water after the reaction to form Schiff bases. The amines to be used in the first step may be any primary amine, and preferably alkyl amines or aryl amines such as methyl amine, ethyl amine, propyl amine, butyl amine and aniline, for economy and optimum solubility. This reaction is carried out preferably in the presence of titanium tetrachloride.

The process of this invention comprises reacting such Schiff bases with carbon monoxide in the presence of cobalt carbonyl, and recovering the product of this invention. Suitable cobalt carbonyls to be used are octacarbonyl dicobalt and its derivatives, such as bis-(triphenyl phosphine) dicobalt hexacarbonyl, bis-(trethyl phosphine) dicobalt hexacarbonyl, bis-(tributyl phosphine) dicobalt hexacarbonyl, bis-(triphenyl stibine) dicobalt hexacarbonyl, bis-(triphenyl arsine) dicobalt hexacarbonyl etc.

The amount of the cobalt carbonyl catalyst is preferably in the range of the so-called catalytic amount, and is usually employed within the range of from about 0.01 mol. percent to about 50 mol. percent based on the Schiff base. The reaction of the Schiff base with carbon monoxide is preferably carried out in a hydrocarbon solvent such as benzene, toluene, xylene, pentane, hexane, cyclohexane or the like. It is desirable to conduct the reaction under elevated carbon monoxide pressure for example, a carbon monoxide pressure of from about 30 kg./cm.$^2$ to about 500 kg./cm.$^2$. While the reaction temperature of the process of this invention is a temperature in the range of from about 150° C. to about 300° C., it is preferably a temperature in the range of from about 200° C. to about 230° C. Under such reaction conditions, the reaction proceeds rapidly. After the completion of the reaction, the catalyst, which separates out, is removed, and the reaction mixture is concentrated to give a phthalimidine compound in accordance with this invention in good yield.

The phthalimidine compounds thus obtained can be converted into corresponding aromatic tetracarboxylic acids by conventional procedures. For instance, the phthalimidine compound may be oxidized, and then hydrolyzed to give aromatic tetracarboxylic acid. The oxidizing agent to be used in the oxidation reaction is not critical and includes any conventional oxidizing agent, such as, for example, nitric acid, chromic acid anhydride, alkali salts of bichromic acid, alkali salts of permanganic acid etc. Nitric acid is preferred.

When nitric acid is used as the oxidizing agent, it preferably has a concentration of more than 20%, and is preferably used in excess. This reaction is carried out by heating the nitric acid in mixture with the phthalimidine compound preferably at a temperature in the range of from about 90° C. to about 200° C. The reaction proceeds more efficiently in a sealed unit. The hydrolysis of diimides obtained by the oxidation reaction is carried out according to an conventional method involving acid- or alkali-catalyzed hydrolysis by contact with, for example alkali-containing water such as aqueous sodium hydroxide, potassium hydroxide etc., or acids such as hydrochloric or sulfuric acid. When the hydrolysis is carried out by the use of alkali, the product is obtained as the salt, which may be thereafter readily converted into free carboxylic acid.

The oxidation and the hydrolysis reactions may be carried out as one step or in separate reactions. For example, with nitric acid, both oxidation and hydrolysis reactions take place concurrently to give the tetracarboxylic acid directly.

In the case where A as defined above is methylene or —S—, the oxidation reaction frequently is accompanied by the simultaneous oxidation of A into —CO— and —SO$_2$— respectively.

DESCRIPTION OF THE PREFERRED EMBODIMENTS

Example 1

10 g. of 4,4'-diformyldiphenyl ether is dissolved in 300 ml. of benzene, to which solution 6 g. of methyl amine is introduced while cooling with ice water below 10° C., and the ultimate mixture stirred for 3 hours. Then the water formed is removed as an azeotropic mixture with benzene. After distilling off the benzene under reduced pressure, 10.5 g. of a Schiff base was obtained as slightly yellow needle crystal, having the following analysis:

N,N'-[oxybis-(p-phenylene-methylidine)] bis-(methyl amine) Elemental analysis: C, 75.95(76.16), H, 6.38 (6.39), N, 10.81(11.10) molecular weight measurement (benzene 37° C.): 255.1(252) NMR spectrum (CDCl$_3$): $\tau$6.55; N-CH$_3$, $\tau$3.06, $\tau$2.43; phenyl-H, $\tau$1.89; N=CH— IR spectrum: 1630 cm.$^{-1}$ $\nu$C=N.

3.0 g. of the Schiff base thus obtained is charged in a 100 ml. stainless steel autoclave together with 30 ml. of benzene and 0.3 g. of octacarbonyl dicobalt. After displacement with nitrogen, the autoclave was compressed with carbon monoxide to the pressure of 100 kg./cm.$^2$ and reacted at 230° C. for 3 hours. After cooling to room temperature and degassing, the contents of the autoclave were discharged and filtered to remove solid mass. The filtrate was concentrated to give as a precipitate 3.3 g. of crude product which was then recrystallized from an active carbon-ethanol mixture to give a slightly yellow solid.

6,6'-oxybis(2-methyl phthalimidine) Elemental analysis: C, 69.64(70.11), H, 5.47(5.23), N, 9.04(9.09) Molecular weight measurement: (chloroform 37° C.): 306.7(308.3) NMR spectrum (CDCl$_3$): $\tau$6.86; N—CH$_3$, $\tau$5.71; —CH$_2$—H, $\tau$2.75; phenyl-H IR spectrum: 1690 cm.$^{-1}$ $\nu$C=O, M.P. 212–213° C.

2 g. of thus obtained carbonylate product and 20 ml. of 30% nitric acid were charged in a sealed glass tube and heated in a stainless steel autoclave under nitrogen pressure of 5 kg./cm.$^2$ at 140° C. for 4 hours. After cooling to the room temperature and degassing, the contents of the tube were discharged. Removal of nitric acid by distilling under reduced pressure gave a residue comprising 2.1 g. of crude 3,3',4,4'-diphenylether tetracarboxylic acid which was then recrystallized from water to give crystals melting at 229° C.

Elemental analysis: C, 55.68(55.50); H, 3.16(2.91).

Example 2

A solution of 2.5 g. of 6,6'-oxybis-(2-methylphthalimidine), obtained in Example 1, in 30 ml. glacial acetic acid was charged in a three-necked flask and heated at 90° C. for 15 hours under stirring while introducing dropwise a solution of 5 g. sodium bichromate in 25 ml. glacial acetic acid. After oxidation reaction, the contents were cooled and N,N'-dimethyl-3,3',4,4'-diphenyl ether tetracarboxylic acid diimide was separated as needle-like crystals, which was then filtered to give 2.1 g. of the crystals. An additional 0.2 g. of the crystals was obtained by concentrating the filtrate and diluting with water. Melting point >250° C.

Elemental analysis: C, 64.12(64.28), H, 3.58(3.60), N, 8.32(8.33).

2.0 g. of the diimide obtained above was heated in a sealed tube together with 10 ml. of concentrated hydrochloric acid at 150° C. for 10 hours, and then concentrating by distillation under reduced pressure to give 2.3 g. of 3,3',4,4'-diphenyl ether tetracarboxylic acid as residue, which was recrystallized from water to give crystals melting at 229° C.

Example 3

To 10 g. of 4,4'-diformyldiphenyl ether dissolved in 300 ml. of benzene was added 9 g. of ethyl amine, while cooling with ice water below 10° C., and the resultant mixture stirred for 3 hours at room temperature. The water formed was removed as an azeotropic mixture. After the removal of benzene by distillation under reduced pressure, 11.5 g. of Schiff base was recovered as slightly yellow crystals, having the following analysis:

N,N' - [oxybis-(p-phenylenemethylidine)] bis(ethylamine). Elemental analysis: C, 77.05(77.11), H, 7.16 (7.19), N, 9.79(9.99) molecular weight measurement (benzene 37° C.): 282.2(280.36) NMR spectrum (CDCl$_3$): $\tau$8.70 (triple line): —CH$_3$, $\tau$6.39 (quartet line); N—CH$_2$—, $\tau$1.88; N=CH—, IR spectrum: 1630 cm.$^{-1}$ $\nu$C=N.

A 100 ml. autoclave was charged with 3.0 g. of the thus obtained Schiff base, 30 ml. of toluene and 0.3 g. of octacarbonyl dicobalt, compressed with carbon monoxide, after displacement with nitrogen to the pressure of 50 kg./cm.$^2$, and then reacted at 230° C. for 2 hours. After cooling to room temperature and degassing, the contents were discharged and filtered to remove solids. The filtrate was then concentrated to give 3.2 g. of crude product which was recrystallized with an active carbon-ethanol mixture to give white crystals, having the following analysis:

6.6'-oxybis-(2-ethylphthalimidine) Elemental analysis: C, 71.32(71.41), H, 5.89(5.99), N, 8.25(8.33) molecular weight measurement (chloroform 37° C.): 334.2(336.38) NMR spectrum (CDCl$_3$): $\tau$8.74 (triple line); —CH$_3$ $\tau$6.81 (quartet line): N—CH$_2$—CH$_3$ $\tau$5.60; $\phi$—CH$_2$—N IR spectrum; 1690 cm.$^{-1}$ $\nu$C=O M.P. 176–178° C.

2 g. of the carbonylated compound thus obtained was sealed in a glass tube together with 20 ml. of 30% nitric acid and heated in a stainless steel autoclave under nitrogen pressure of 5 kg./cm.$^2$ and reacted at 140° C. for 4 hours. After cooling to room temperature and degassing, the contents were discharged and freed from nitric acid by distilling under reduced pressure to give 1.95 g. of crude product (3,3', 4,4'-diphenylether tetracarboxylic acid) as residue. Recrystallization from water gave crystals having a melting point of 229° C.

Example 4

To a solution of 10 g. of 4,4'-diacetylbiphenyl in 350 ml. of benzene was added 15 g. of methyl amine while cooling with ice water below 10° C. To this was added a solution of 8.6 g. of titanium tetrachloride in 50 ml. of benzene dropwise with stirring. After stirring for an additional 5 hours, the white precipitate formed was removed by filtration. The filtrate was concentrated under reduced pressure to give 10.5 g. of Schiff base as white flaky crystals, having the following analysis:

N,N' - (4,4' - biphenylilene)diethylidine bis(methyl amine) M.P. 164–165° C. Elemental analysis: C, 81.77 (81.78), H, 7.59(7.33), N, 10.59(10.60) molecular weight measurement (chloroform 37° C.); 262.1(264.4) NMR spectrum (CDCl$_3$): $\tau$7.70; —CH$_3$, $\tau$6.58; N—CH$_3$ IR spectrum 1630 cm.$^{-1}$ $\nu$C=N.

A 100 ml. autoclave was charged with 3 g. of the thus obtained Schiff base, 30 ml. of benzene, and 0.4 g. of octacarbonyl cobalt, and after displacement with nitrogen was compressed with carbon monoxide a pressure of 100 kg./cm.$^2$. It was then heated at 230° C. for 2 hours to effect reaction, then cooled to room temperature, degassed and the contents filtered to remove solids.

The filtrate was concentrated and 2.6 g. of crude carbonylated product was recovered. This product consisted of a mixture of cis- and trans-isomers as a result of the stereoscopic configuration of the methyl group, and had the following analysis:

2,2', 3,3'-tetramethyl-6,6'-biphthalimidine NMR spectrum (CDCl$_3$): $\tau$8.48 (double line); CH$_3$—CH=, $\tau$6.83; =N—CH$_3$, $\tau$5.45 (quartet line) =C—H IR spectrum: 1680 cm.$^{-2}$ $\nu$C=O.

2.0 g. of the thus obtained carbonylated product was charged into a sealed glass tube together with 20 ml. of 30% nitric acid and heated in an autoclave at 135° C. for 5 hours under nitrogen pressure of 5 kg./cm.$^2$. After cooling to room temperature and degassing, the contents were discharged and freed from nitric acid by distillation under reduced pressure to give 1.95 g. of crude product (3,3', 4,4'-biphenyl tetracarboxylic acid) as residue. After recrystallization from water, crystals with a melting point greater than 250° C. were obtained.

Elemental analysis: C, 57.98(58.19), H, 3.01(3.05)

Example 5

In accordance with the procedure of Example 4, 4,4'-diacetyl biphenyl was reacted with ethyl amine in place of methyl amine to give the corresponding Schiff base, having the following analysis:

N,N'-(4,4'-biphenylilene)diethylidine bis(ethylamine) Elemental analysis: C, 80.52(80.48), H, 10.70(10.13), N, 9.54(9.39) molecular weight measurement (chloroform 37° C.); 308.1 (298.46) NMR spectrum (CDCl$_3$): $\tau$8.65 (triple line); —CH$_2$—CH$_3$, $\tau$7.74; =C�propyl—CH$_3$, $\tau$6.43 (quartet line); N—CH$_2$— IR spectrum: 1630 cm.$^{-1}$ $\nu$C=N.

A stainless steel autoclave was charged with 3.0 g. of the Schiff base obtained in this example, 30 ml. of benzene and 0.3 g. of bis-triphenylphosphine dicobalt hexacarbonyl, displaced with nitrogen, then compressed with carbon monoxide to the pressure of 75 kg./cm.$^2$, and heated at 230° C. for 3 hours to effect the reaction. After cooling to room temperature and degassing, the contents were discharged and freed from the solid mass by filtration. The filtrate was concentrated to give 2.5 g. of crude carbonylated product. This product consisted of a mixture of cis- and trans-isomers resulting from the steric configuration of the methyl and ethyl groups.

Then 2.0 g. of the carbonylated product was sealed in a glass tube together with 30 ml. of 30% nitric acid and heated in an autoclave at 140° C. for 4 hours under nitrogen pressure of 5 kg./cm.$^2$. After cooling to room temperature and degassing, contents were discharged and freed from nitric acid by distillation under reduced pressure to give a residue 1.8 g. of 3,3', 4,4'-biphenyl tetracarboxylic acid.

Example 6

A solution of 10 g. of 4,4'-diacetyl biphenyl in 350 ml. of benzene was cooled with ice water and combined with 25 g. of n-butyl amine added dropwise thereto, and further combined with a solution of 8.6 g. of titanium tetrachloride in 50 ml. of benzene added dropwise with stirring. After additional stirring for 5 hours, white crystals formed were removed by filtration and the filtrate was concentrated under reduced pressure to give 14 g. of the Schiff base, N,N'-[4,4'-biphenylilene)diethylidine] bis(n-butyl amine) NMR spectrum (CDCl$_3$): 8.0–9.1 —CH$_2$CH$_2$—CH$_3$, 7.73;

=C̈—CH$_3$ $\tau$6.46 (triple line) =N—CH$_2$— IR spectrum: 1630 cm.$^{-1}$ $\nu$C=N.

An autoclave was charged with 3.0 g. of the thus obtained Schiff base, 30 ml. of benzene and 0.3 g. of octacarbonyl dicobalt, displaced with nitrogen, and then heated at 220° C. for 2 hours under carbon monoxide pressure of 150 kg./cm.². After cooling to room temperature and degassing, the contents were removed and filtered to remove the solid mass. Concentration of the resulting filtrate gave 2.6 g. of crude carbonylated product. 2.0 g. of the carbonylated product was then oxidized in accordance with the procedure of Example 5, using nitric acid, to give 1.55 g. of 3,3', 4,4'-biphenyl tetracarboxylic acid.

Example 7

The procedure of Example 6 was repeated, except that 4,4'-dipropionyl diphenyl methane was reacted in place of 4,4'-diacetyl biphenyl, with ethyl amine to give the corresponding Schiff base, N,N'-[methylenebis(p-phenylene propylidine)] bis(ethyl amine) B.P. 174–176° C./5×10⁻³ mm. Hg Elemental analysis: C, 82.31(82.58), H, 9.07 (9.04), N, 8.33(8.38) Molecular weight measurement (benzene 37° C.): 332.8(334.5) NMR spectrum (CDCl₃): τ8.9(triple line); —CH₂—CH₃, τ8.67(triple line); N—CH₂—CH₃, τ7.30(quartet line);

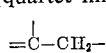

τ6.40(quartet line); N—CH₂— τ5.98; φ—CH₂—φ, τ2–3; phenyl-H IR spectrum: 1630 cm.⁻¹ νC=N.

An autoclave was charged with 3.0 g. of the thus obtained Schiff base, 30 ml. of benzene and 0.4 g. of octacarbonyl cobalt, displaced with nitrogen, and then compressed with carbon monoxide to a pressure of 100 kg./cm.², and heated at 230° C. for 4 hours to complete the reaction. After cooling to room temperature, the autoclave was degassed and the contents discharged. The contents were then filtered to remove the solid mass and the filtrate was concentrated to give 3.1 g. of the carbonylated product.

6,6'-methylenebis(2,3 - diethyl phthalimidine) NMR spectrum: τ9.44(triple line), τ8.78(triple line); —CH₃—, τ7.8–8.2; —CH₂—, τ6.5–7.1, τ5.7–6.3; =N—CH₂—, τ5.82; φ—CH₂—φ τ5.36;

IR spectrum: 1680 cm.⁻¹ νC=O.

2.0 g. of the carbonylated product obtained above was charged in a sealed glass tube together with 30 ml. of 45% nitric acid and heated in an autoclave under nitrogen pressure of 5 kg./cm.². After cooling to room temperature and degassing, the contents were discharged and distilled under reduced pressure to remove nitric acid to give 17.5 g. of 3,3',4,4' benzophenone tetracarboxylic acid as the residue. This was thereafter recrystallized from water to give crystals melting at 215° C.:

Elemental analysis: C, 56.87(56.99), H, 2.79(2.81).

Example 8

4,4'-dipropionyl diphenyl methane was reacted in accordance with the procedure of Example 7 with methyl amine instead of ethyl amine to give the corresponding Schiff base.

N,N'-[methylene bis-(p-phenylenepropylidine)] bis (methylamine) Elemental analysis: C, 82.09(82.31), H, 8.56(8.55), N, 9.10(9.14) molecular weight measurement (benzene 37° C.): 305.1(306.4) NMR spectrum (CDCl₃): τ8.94(triple line); —CH₂—CH₃, τ7.35(quartet line);

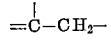

τ6.69; N—CH₃, τ6.07; φ—CH₂—φ, τ2.2–3.2; phenyl-H IR spectrum: 1630 cm.⁻¹ νC=N.

An autoclave was charged with 3.0 g. of the Schiff base obtained above, 30 ml. of benzene and 0.4 g. of bis-triethylphosphine dicobalt hexacarbonyl, displaced with nitrogen and compressed with carbon monoxide to a pressure of 100 kg./cm.², and thereafter heated at 230° C. for 5 hours to complete the reaction. After cooling to room temperature, the autoclave was degassed and the contents discharged and filtered to remove the solid mass. The filtrate was concentrated to give 3.1 g. of carbonylated product.

2.0 g. of the carbonylated product thus obtained was placed together with 30 ml. of 30% nitric acid in a sealed glass tube, and heated in an autoclave to a nitrogen pressure of 5 kg./cm.² at 140° C. for 4 hours. After cooling to room temperature, the autoclave was degassed and the contents discharged. After distilling off nitric acid under elevated pressure, the residue comprising 1.9 g. of 3,3',4,4'-benzophenone tetracarboxylic acid was obtained. It was then recrystallized from acetic acid to give crystals melting at 215° C.

Example 9

4,4'-diacetyl biphenylsulfide was reacted with ethyl amine according to the procedure of Example 5 to give the corresponding Schiff base.

N,N' - [thiobis - (p - phenylenediethylidine)] bis-(ethyl amine) Elemental analysis: C, 73.92(74.04), H, 7.45(7.46), N. 8.61(8.64) molecular weight measurement (benzene 37° C.): 321.8(324.4) NMR spectrum (CDCl₃): τ8.67 (triple line) —CH₂—CH₃, τ7.76; =C—CH₃, τ6.44 (quartet line); =N—CH₂, τ2–3.5; phenyl-H IR spectrum: 1630 cm.⁻¹ νC=N.

A 100 ml. autoclave was charged with 3.0 g. of the Schiff base obtained above, 30 ml. of benzene and 0.4 g. of octacarbonyl dicobalt, displaced with nitrogen, then compressed with carbon monoxide to a pressure of 100 kg./cm.², and heated at 230° C. for 24 hours to effect the reaction. After cooling to room temperature, the autoclave was degassed and the contents, discharged. After filtering off the solid mass, the filtrate was condensed to give 2.9 g. of carbonylated product.

6,6'-thio-bis-3-methyl-2-ethyl phthalimidine Elemental analysis: C, 69.31(69.45), H, 6.35(6.36), N, 7.32(7.36) IR spectrum 1690 cm.⁻¹ νC=O.

2.0 g. of the carbonylated product was put into a sealed glass tube together with 30 ml. of 30% nitric acid, and heated in an autoclave under nitrogen pressure of 5 kg./cm.² at 140° C. for 5 hours. After cooling to room temperature, the autoclave was degassed and the contents discharged. After the removal of nitric acid by distillation under reduced pressure, there was recovered 1.8 g. of 3,3',4,4'-diphenylsulfone tetracarboxylic acid. M.P. 216–219° C.:

Elemental analysis: C, 52.81(53.05), H, 2.75(2.78).

Example 10

A 100 ml. autoclave was charged with 5 g. of the Schiff base obtained by reacting 4,4'-diformyldiphenyl ether with aniline, 25 ml. of benzene and 0.5 g. of octacarbonyl dicobalt, then displaced with nitrogen and charged with carbon monoxide to a pressure of 150 kg./cm.². The Schiff base thus obtained was N,N'-[oxy-bis-(p-phenylene methylidine)] bis[aniline]:

Elemental analysis: C, 82.80(82.95), H, 5.30(5.36), N, 7.42(7.44), IR spectrum: 1620 cm.⁻¹ νC=N. After heating in the autoclave at 230° C. for 10 hours to effect the reaction, the contents were cooled to room temperature and degassed, and the contents discharged. The crystals separated were collected by filtration and washed several times with hydrochloric acid. The carbonylated product comprised 6,6'-oxy-bis-[2-phenylphthalimidine] Elemental analysis: C, 77.69(77.76), H, 4.62(4.66), N, 6.46(6.48), IR spectrum: 1690 cm.⁻¹ νC=O, M.P. >250° C.

2.0 g. of the thus obtained carbonylated product (formed in the overall yield of 5.1 g.) was put in a sealable glass tube together with 20 ml. of 30% nitric acid and heated in an autoclave under nitrogen pressure of 5 kg./cm.² at 150° C. for 5 hours. After cooling to room temperature and degassing, the contents were discharged and freed from solid contents by filtration. The filtrate was then distilled under reduced pressure to remove nitric acid to thereby give 1.5 g. of a residue comprising 3,3',4,4'-diphenylether tetracarboxylic acid.

Example 11

4,4'-diformyl biphenyl and methyl amine were reacted in a manner similar to Example 1 to form as the Schiff base N.N'-[4,4'-biphenylene dimethylidine]bis-(methyl amine), which was thereafter carbonylated in the manner of Example 1. The resulting carbonylated compound was likewise oxidized, and then hydrolyzed with 30% nitric acid to give 3,3',4,4'-biphenyl tetracarboxylic acid as the crystal. Recrystallization from water gave crystals with a melting point of 229° C. (total yield 85%):

The carbonylated product obtained above was 2,2'-dimethyl-6,6'-biphthalimidine.

Elemental analysis: C, 73.92(73.95), H, 5.50(5.52), N, 9.57(9.58), IR spectrum: 1690 cm.$^{-1}$ $\nu$C=O, M.P. >250° C.

What is claimed is:

1. A phthalimidine compound represented by the following structural formula:

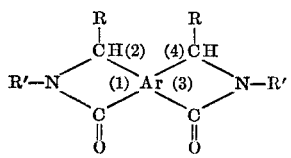

wherein Ar is a tetra-valent radical containing two benzene rings, represented by the structural formula:

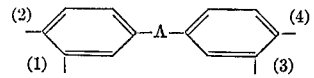

wherein A is either nil or a divalent radical selected from the group consisting of alkylene radicals having 1–3 carbon atoms, —O— and —S—, the linkages (1) and (2) being directly attached to adjacent carbon atoms of one of said benzene rings and the linkages (3) and (4) being directly attached to adjacent carbon atoms of another benzene ring; R is a radical selected from the group consisting of hydrogen, alkyl having 1–4 carbon atoms and phenyl, and R' is a radical selected from the group consisting of alkyl having 1–4 carbon atoms and phenyl.

2. The compound of claim 1 in which R is hydrogen, and R' is alkyl having 1–4 carbon atoms.

References Cited

UNITED STATES PATENTS 2,841,591  7/1958  Prichard _____ 260—325

ALEX MAZEL, Primary Examiner

J. A. NARCAVAGE, Assistant Examiner

U.S. Cl. X.R.

260—78.4 R, 516, 520, 566 F